United States Patent
Payot et al.

(10) Patent No.: US 8,540,050 B2
(45) Date of Patent: Sep. 24, 2013

(54) GLAZING UNIT WITH IMPROVED VIBROACOUSTIC DAMPING PROPERTIES, METHOD FOR MAKING SUCH A GLAZING UNIT AND METHOD FOR ACOUSTIC PROTECTION IN A VEHICLE PASSENGER COMPARTMENT

(75) Inventors: Sylvain Payot, Compiegne (FR); David Fournier, Breteuil (FR)

(73) Assignee: Saint-Gobain Glass France, Courbevoie (FR)

( * ) Notice: Subject to any disclaimer, the term of this patent is extended or adjusted under 35 U.S.C. 154(b) by 34 days.

(21) Appl. No.: 13/260,022

(22) PCT Filed: Apr. 12, 2010

(86) PCT No.: PCT/FR2010/050701
§ 371 (c)(1), (2), (4) Date: Oct. 4, 2011

(87) PCT Pub. No.: WO2010/119217
PCT Pub. Date: Oct. 21, 2010

(65) Prior Publication Data
US 2012/0018245 A1     Jan. 26, 2012

(30) Foreign Application Priority Data
Apr. 16, 2009   (FR) ...................................... 09 52480

(51) Int. Cl.
*F16F 15/00*     (2006.01)
(52) U.S. Cl.
USPC ......................................................... 181/208

(58) Field of Classification Search
USPC ........................................................ 181/208
See application file for complete search history.

(56) References Cited

U.S. PATENT DOCUMENTS

| | | | |
|---|---|---|---|
| 4,298,640 A | 11/1981 | Katoh | |
| 7,828,113 B1* | 11/2010 | Dao | 181/208 |
| 7,909,133 B2* | 3/2011 | Payot et al. | 181/208 |
| 8,040,021 B2* | 10/2011 | Blanchard et al. | 310/339 |
| 2005/0211358 A1* | 9/2005 | Tanno | 152/450 |
| 2006/0165977 A1 | 7/2006 | Rehfeld et al. | |
| 2008/0056505 A1 | 3/2008 | Rehfeld et al. | |
| 2010/0133037 A1 | 6/2010 | Payot et al. | |

FOREIGN PATENT DOCUMENTS

| | | |
|---|---|---|
| DE | 29 12 625 | 10/1979 |
| FR | 2 914 589 | 10/2008 |
| WO | 2004 012952 | 2/2004 |

OTHER PUBLICATIONS

International Search Report issued Aug. 24, 2010 in PCT/FR10/050701 filed Apr. 12, 2010.

* cited by examiner

*Primary Examiner* — Forrest M Phillips
(74) *Attorney, Agent, or Firm* — Oblon, Spivak, McClelland, Maier & Neustadt, L.L.P.

(57) ABSTRACT

A glazing unit having improved vibroacoustic damping properties, including: at least one glass sheet; at least one vibroacoustic damping strip, the strip including at least one element made of damping material and the strip being fastened to one of the faces of the glass sheet. The face of the strip facing the glass sheet has a surface area in contact with the glass sheet which is strictly inferior to the surface area of the face of the strip facing the glass sheet. The glazing unit makes it possible to damp noise and vibrations while taking up little space.

16 Claims, 4 Drawing Sheets

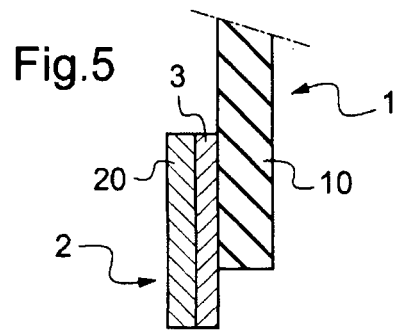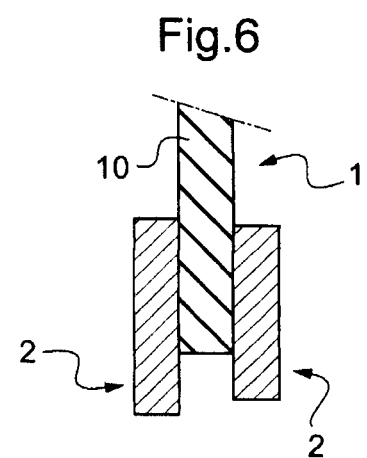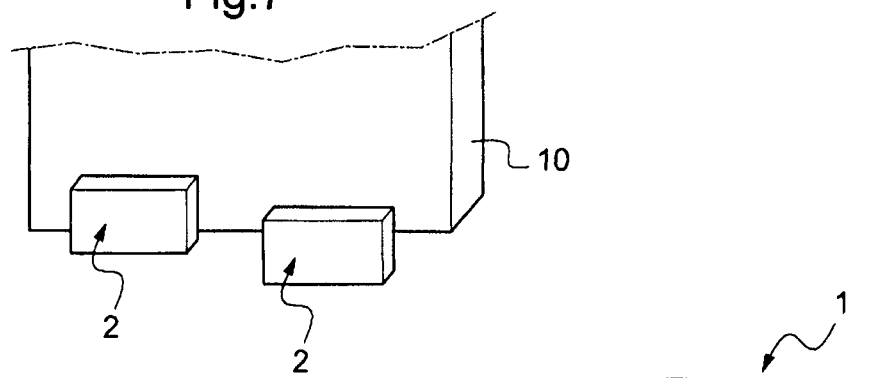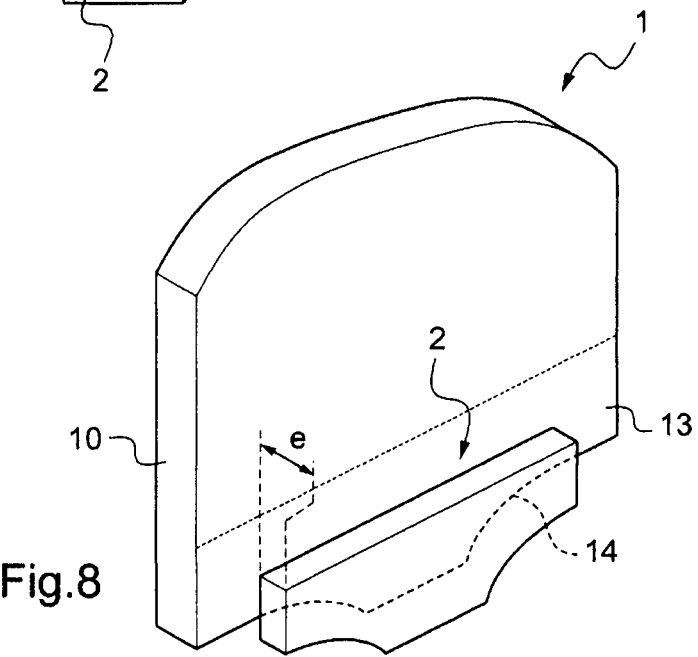

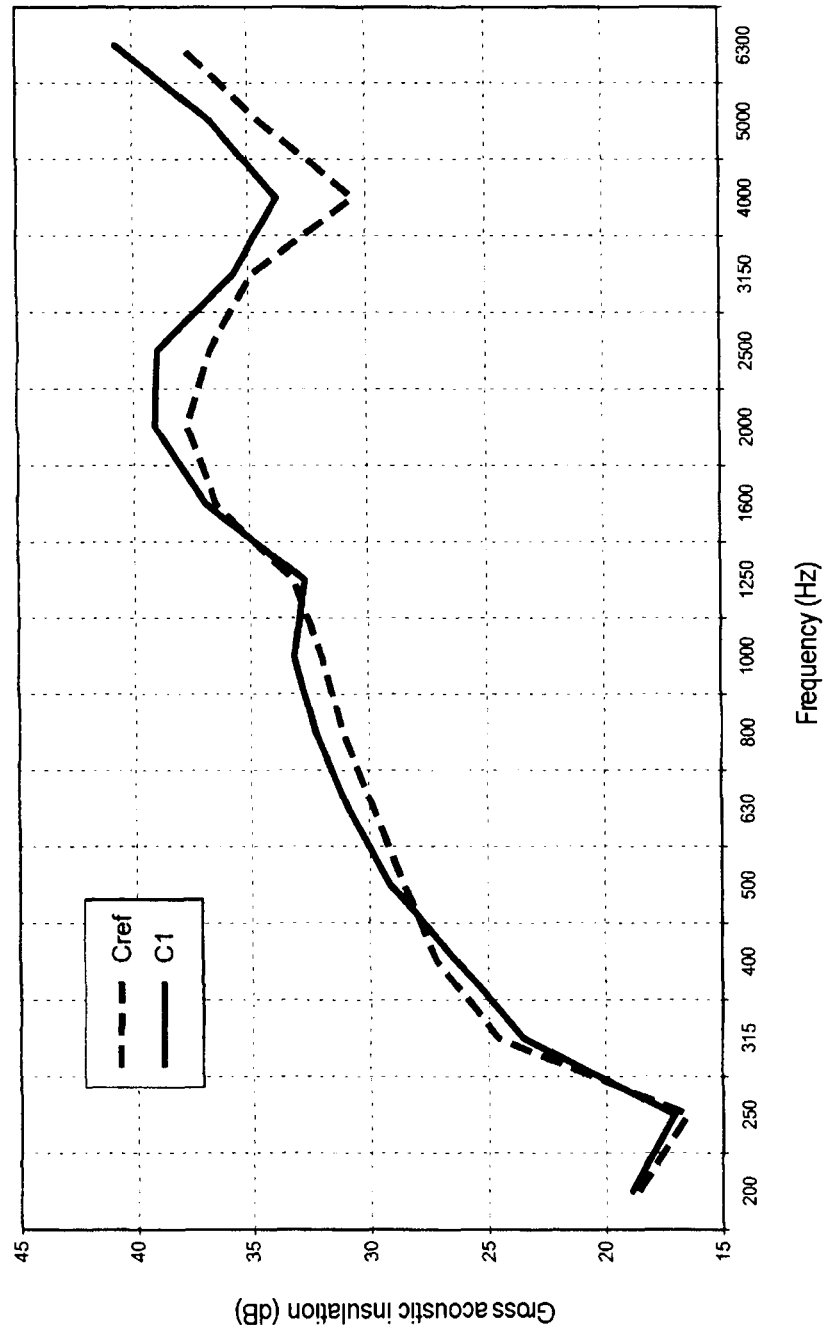

GLAZING UNIT WITH IMPROVED VIBROACOUSTIC DAMPING PROPERTIES, METHOD FOR MAKING SUCH A GLAZING UNIT AND METHOD FOR ACOUSTIC PROTECTION IN A VEHICLE PASSENGER COMPARTMENT

The present invention relates to a glazing unit having improved vibroacoustic damping properties, which comprises a vibroacoustic damping device, and to a method of reducing acoustic and vibratory nuisance in a passenger compartment, in particular a moving passenger compartment such as that of a vehicle, especially an automobile.

Apart from automobiles or other types of vehicle, such as trucks, buses and agricultural machines, the invention applies to any type of locomotion means having a closed or substantially closed passenger compartment, such as airplanes, trains, ships, submarines, etc.

The glazing units associated with vehicles, especially automobiles, are provided with vibroacoustic damping means that serve to absorb the vibratory waves propagating through the glazing unit for the purpose of improving acoustic comfort inside the vehicles.

The sources of annoyance in an automobile, whether their origin is mechanical, thermal, visibility-related, etc., have little by little been addressed. However, improvement in acoustic comfort still remains a current problem.

Noise of aerodynamic origin, i.e. created by the friction of the air against the moving vehicle, has itself been at least partly treated at its source: to save energy, shapes have been modified, improving penetration through the air and reducing the turbulence which is itself a source of noise. Among the walls of a vehicle that separate the source of exterior aerodynamic noise from the interior space occupied by passengers, the glazing units are of course the most difficult to deal with.

It is presently known to provide laminated glazing units, the thermoplastic interlayer of which is suitably chosen so as to have improved vibroacoustic damping properties.

European patent EP B1-0 387 148 thus provides laminated glazing units that achieve good insulation against noise, particularly of aerodynamic origin, i.e. having a high frequency, between 800 and 10 000 Hz.

Furthermore, such laminated glazing units serve to prevent a sudden drop at the critical frequency in transmission loss, this being representative of acoustic insulation. The critical frequency is specific to the composition of the glazing unit (density and Young's modulus of the constituent elements, thicknesses) and corresponds to spatial and frequential coincidence of the flexural waves in the glazing unit with the acoustic waves in the fluid surrounding the glazing unit, such as the air. This critical frequency is typically in the region of 4000 Hz for a glazing unit approximately 3 mm in thickness.

It is at this critical frequency, which lies within the range of frequencies that are particularly audible to the human ear (between 1000 and 6000 Hz), that the noise can therefore be increased. It is desirable therefore to have good insulation performance for noise at this frequency.

An alternative solution (since some glazing units are not laminated) or a complementary solution to the use of laminated glazing units having vibroacoustic properties may consist in joining, to the periphery of the glazing unit and between the glazing unit and the body, a strip having vibroacoustic damping properties which is fastened both to the glazing unit and to the body and which may or may not consist of a juxtaposition of several damping materials.

Patent application WO 04/012952 discloses a strip which, in order to provide such a vibroacoustic damping property, must have an equivalent real linear stiffness $K'_{eq}$ of at least 25 MPa together with an equivalent loss factor $\tan \delta_{eq}$ of at least 0.25. The equivalent linear stiffness is the equivalent stiffness of the strip per linear meter of strip, the stiffness being characterized by the rigidity (mainly the Young's modulus for work in tension-compression) of the materials of which the strip is made and by the geometry of the strip.

In this type of strip, only the stresses and strains undergone by the materials working in tension-compression in the direction normal to the glazing unit are taken into account, those working in shear being negligible. Indeed, compared to the strip, the body is so rigid that it does not deform and cannot absorb vibratory energy. Only the strip can deform significantly and dissipate mechanical energy by working mainly in tension-compression.

This type of damping strip, by also constituting the peripheral seal of the glazing unit, is therefore suitable as it provides the connection between the glazing unit and the body. However, in a vehicle not all the glazing units are fixed over their entire periphery to the body—some of them, such as opening side glazing units, are movable. Thus, this peripheral seal configuration acting as damping means cannot be suitable for the latter glazing units.

Furthermore, for opening side glazing units, a mobility constraint is added. Specifically, the glazing unit
 must be able to slide in a slot of the body of the vehicle, for example in the door, between an open position and a closed position.

There is therefore a need for a glazing unit that makes it possible to damp noise while taking up little space.

Therefore, the invention proposes a glazing unit having improved vibroacoustic damping properties comprising:
 at least one glass sheet;
 at least one vibroacoustic damping strip, the strip comprising at least one element made of damping material and the strip being fastened to one of the faces of the glass sheet;
 the face of the strip facing the glass sheet having a surface area in contact with the glass sheet which is strictly inferior to the surface area of said face of the strip facing the glass sheet.

According to another feature, the surface area of the strip in contact with the glass sheet is greater than 25% of the surface area of the face of the strip facing the glass sheet.

According to another feature, the surface area of the strip in contact with the glass sheet is equal to around 70% of the surface area of the face of the strip facing the glass sheet.

According to another feature, the element made of damping material has a loss factor greater than 0.2 and a Young's modulus greater than 800 MPa, at 20° C. for a particular frequency $f_p$ corresponding to the critical frequency of the glazing unit to within plus or minus 30%.

According to another feature, the strip is not joined to any other device on the opposite side of the glass sheet.

According to another feature, the strip extends over at most the length of the glazing unit.

According to another feature, the strip comprises a plurality of elements made of damping material.

According to another feature, the glazing unit comprises several strips joined to the same face of the glazing unit and/or to two opposite faces of the glazing unit.

According to another feature, the strip comprises at least one element made of damping material and a rigid interlayer element that is arranged between the element made of damping material and the glass sheet, the rigid interlayer element having a loss factor of less than 0.2 and a Young's modulus greater than 1600 MPa at 20° C. for the particular frequency chosen $f_p$.

According to another feature, the strip comprises, on its face facing the glass sheet, bonding means of the double-sided adhesive type.

The invention also relates to a vehicle, in particular an automobile, comprising a body and a glazing unit as described above, the strip being hidden from view in the body.

According to another feature, the glazing unit is an opening side glazing unit.

The invention also relates to a method of manufacturing a glazing unit as described above, for the purpose of reducing acoustic and vibratory nuisance in a passenger compartment of a vehicle, especially an automobile, comprising such a glazing unit, the method comprising the following steps:
 providing a glazing unit comprising at least one glass sheet;
 providing at least one vibroacoustic damping strip comprising at least one element made of damping material;
 fastening the strip to at least one of the faces of the glazing unit so that the face of the vibroacoustic damping strip facing the glass sheet has a surface area in contact with the glass sheet which is strictly inferior to the surface area of said face of the strip facing the glass sheet.

The invention also relates to a method of acoustic protection in a passenger compartment of a vehicle, especially of an automobile, comprising the following step:
 the mounting, in the body of the vehicle, of a glazing unit having improved vibroacoustic damping properties which comprises at least one glass sheet and at least one vibroacoustic damping strip, the strip comprising at least one element made of damping material and the strip being fastened to one of the faces of the glazing unit, the face of the strip facing the glass sheet having a surface area in contact with the glass sheet which is strictly inferior to the surface area of said face of the strip facing the glass sheet.

According to another feature, the glazing unit is as described above.

Other details and advantages of the invention will now be described with regard to the appended drawings in which:

FIGS. 3 to 5 are partial cross-sectional views of glazing units according to the invention, provided with various strip variants;

FIG. 6 is a partial cross-sectional view of a glazing unit according to the invention, provided with two strips placed on two opposite faces of the glazing unit;

FIG. 7 is a partial perspective view of a glazing unit according to the invention, provided with two strips placed on the same face of the glazing unit;

FIG. 8 is a perspective view of a glazing unit according to the invention provided with a supplementary strip variant;

Figure 10:
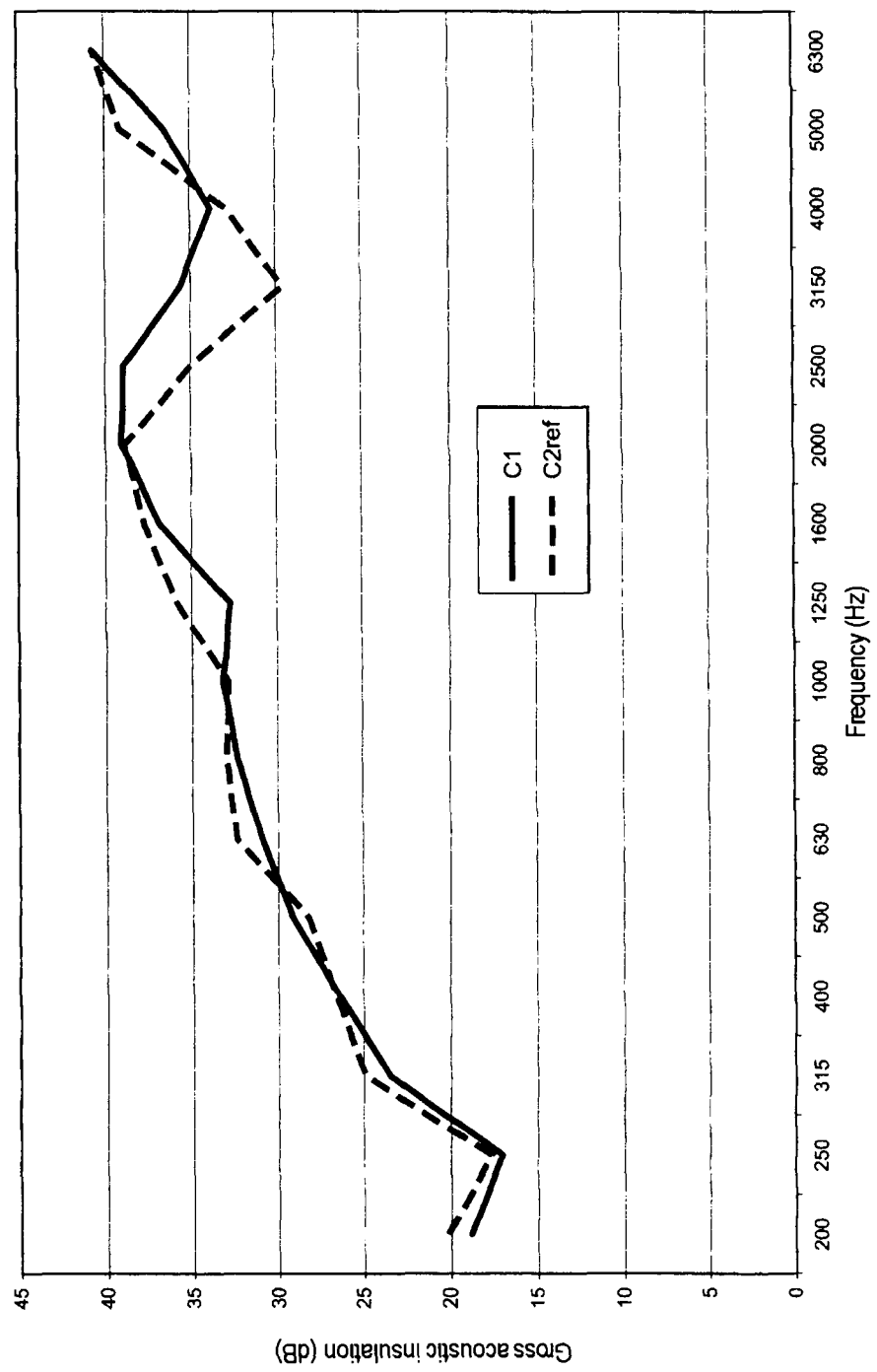

FIG. 9 shows comparative curves of raw acoustic insulation between a blank glazing unit and a glazing unit according to the invention, provided with a strip, with identical glass thicknesses; and FIG. 10 shows comparative curves of raw acoustic insulation between a blank glazing unit having a thickness of 3.85 mm and a glazing unit according to the invention, with a glass thickness of 3.15 mm, provided with a strip.

FIGS. 1 to 8 have not been drawn to scale so as to make them easier to understand. Furthermore, the references that are identical in the various figures represent identical or similar elements.

The invention relates to a glazing unit having improved vibroacoustic damping properties, which comprises at least one glass sheet and at least one vibroacoustic damping strip comprising at least one element made of a damping material. Thus, the glazing unit makes it possible to damp noise.

The strip is fastened to one of the faces of the glass sheet. The face of the strip facing the glass sheet has a surface area in contact with the glass sheet which is strictly inferior to the surface area of said face of the strip facing the glass sheet.

Thus, a portion of the strip is not fastened to the glass sheet and is separate from the surface area of the glass sheet. This portion of the strip therefore juts out from the edge of the glass sheet. In this way, the strip only takes up a little space on the glass sheet. The whole of the strip can easily be placed under the weatherstrip seal of a vehicle glazing unit frame even when the glazing unit is in the closed position.

The glazing unit according to the invention therefore makes it possible to damp noise while taking up little space.

Figure 1:
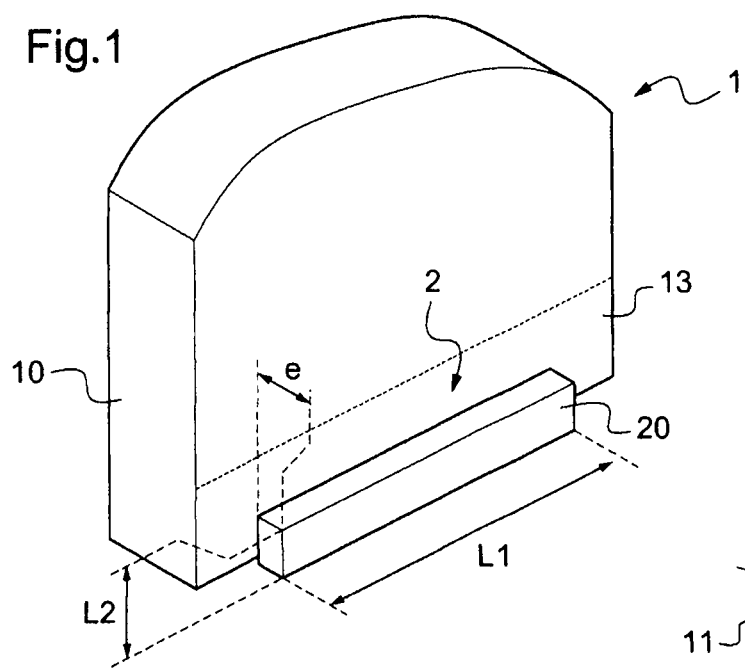
FIG. 1 is a perspective view of a glazing unit according to the invention, provided with a strip.
Figure 2:
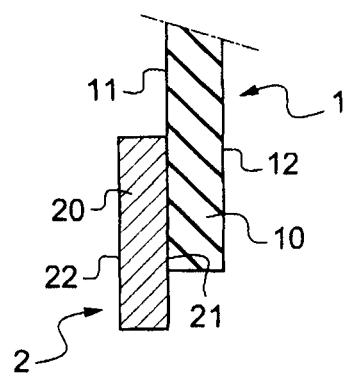
FIG. 2 is a partial cross-sectional view of the glazing unit of FIG. 1.

FIGS. 1 and 2 illustrate a glazing unit 1 comprising at least one glass sheet 10 to which at least one strip 2 is fastened. The strip 2 is fastened to the glass sheet so that the surface area of the strip in contact with the glass sheet is strictly inferior to the total surface area of the face of the strip facing the glass sheet. The strip 2 is, for example, parallelepipedal.

In all of the figures, a single glass sheet is represented. However, the glazing unit according to the invention may be laminated and comprise two glass sheets between which a plastic interlayer sheet is sandwiched. For ease of understanding, reference will only be made in the remainder of the description to one glass sheet, without this being understood as being a limitation.

The glazing unit 1 is intended to be housed in a vehicle body, such as that of an automobile, for example in a door shell in order to form a side glazing unit, advantageously an opening side glazing unit.

The glazing unit 1 has two opposed faces 11 and 12. One of the faces 11 is intended to face the interior of the vehicle, while the other face 12 will be turned toward the external environment. The strip is preferably fastened to the outer face of the glass sheet for reasons of available space on the inside of the body of the vehicle.

In addition, the glazing unit 1 has a marginal portion 13, bounded by the dotted line in FIG. 1. This marginal portion is intended to be in the body of a vehicle, once the glazing unit 1 equipped with the strip is mounted on a vehicle. The marginal portion 13 is called the bottom band in the case of an opening side glazing unit. The marginal portion 13 is thus preferably on the bottom portion of the glazing unit when the glazing unit is mounted on a vehicle. The marginal portion 13 is intended not to be visible as it is intended to be housed in the body in order to fix the glazing unit to the window regulator system. The marginal portion 13 is then below the glazing unit weatherstrip seal, located at the bottom of the glazing unit frame, this being regardless of the degree of opening or closing of the glazing unit.

The portion of the strip 2 fastened to the glass sheet is fastened to the marginal portion 13. Thus, the strip 2 is hidden from view when the glazing unit is mounted on a vehicle.

The strip 2 juts out from the edge of the glass sheet 10, as can be seen, in particular in FIG. 2. This allows space to be saved on the marginal portion 13. The surface area of the strip 2 fastened to the glass sheet 10 is preferably greater than 25% and strictly inferior to 100% of the surface area of the face of the strip facing the glass sheet. Thus, the contacting surface area is sufficient both to enable good acoustic damping and to guarantee durable adhesion of the strip to the glass sheet, and at the same time is reduced in order to allow space to be saved on the glass sheet. The surface area of the strip 2 fastened to the glass sheet 10 is more preferably around 70%, which allows a good compromise between the competing criteria (space saving, acoustic damping and adhesion).

The strip 2 does not form a seal. It is preferably arranged along a single side of the glazing unit. In addition, it preferably extends over at most the length of the glazing unit. Thus, it does not disturb the possible sliding of the glazing unit in the rails of a window regulator.

The strip 2 also comprises at least one element 20 made of damping material. In the embodiment from FIGS. 1 and 2, the strip comprises a single element 20 made of damping material.

The element made of damping material 20 has a loss factor greater than 0.2 and a Young's modulus greater than 800 MPa, at 20° C. and advantageously for a particularly frequency $f_p$ of the glazing unit which corresponds to the critical frequency of the glazing unit, or to within plus or minus 30% of this critical frequency.

The damping material is, for example, a bituminous material or a filled carbon-based polymer.

The Young's modulus of the damping material and its loss factor are measured using a viscoanalyzer.

In a known manner, the critical frequency $f_c$ of a glazing unit is given by the relationship $f_c \approx 11.6/h$, with h being the thickness of the glazing unit in m. Typically the critical frequency of a glazing unit is thus between 2000 Hz and 5000 Hz depending, in particular on the thickness of the glazing unit.

Specifically, it is found that for the movable glazing units of vehicles, in particular of automobiles, the frequency range for which it is desired to obtain improved insulation corresponds to the frequency range lying around the critical frequency of the glazing unit. It will therefore be advantageous to choose a particular frequency $f_p$ equal, to within plus or minus 30%, to the critical frequency $f_c$ of the glazing unit ($f_p = f_c \pm 30\%$). It is in fact around this critical frequency that the transmission of noise from outside the vehicle, through the glazing unit, is the most marked, being manifested in terms of measurement by a pronounced drop in acoustic insulation. The features of the damping material therefore make it possible to improve, more particularly, the vibroacoustic damping of the glazing unit. Thus, the particular frequency $f_p$ may more particularly correspond to the critical frequency of the glazing unit.

Thus, the glazing unit provides vibroacoustic damping properties whatever its association with the body of the vehicle and independently of the body; the damping material fully plays its part of dissipating vibrational energy, but instead of working in tension-compression in a plane normal to the glazing unit, the strip works in tension-compression in the plane of the glazing unit. This work in tension-compression in the plane of the glazing unit, which it is preferred instead to call work in elongation, proves to be astonishingly effective.

The inventors have thus demonstrated that the combination of a strip with a glazing unit for dissipating vibrational energy is even more effective since the material of the strip is damping (which is linked to the loss factor) and especially since the strip is rigid (which is linked to the Young's modulus of the material(s) constituting the strip) in order to ensure work in elongation.

For example, according to FIG. 1, a strip having a length L1 of 600 mm and a width L2 of 100 mm and also a thickness e of 5 mm may be fastened to a glass sheet having a thickness of 3.85 mm and dimensions of 800 mm×500 mm. Preferably, only 70% of the width L2 is fastened to the glass sheet 10. The remainder of the width of the strip (30 mm) juts out from the glass sheet.

The damping element 20 comprises a face 21 for fastening to one of the faces 11 of the glass sheet and a free opposite face 22.

The fastening to the glass sheet is carried out by adhesive means compatible with each of the constituent materials of the damping element and of the glass. The adhesive means are of known type, for example self-adhesive means or means constituted of a heat-activated adhesive. For example, the strip comprises, on its face that faces the glass sheet, bonding means of double-sided adhesive type. The adhesive means are preferably only on the portion of the face of the strip which is in contact with the glass sheet. As a variant, for reasons of simplicity of manufacture, the adhesive means are over the entire surface of the face of the strip which faces the glass sheet, and a non-adhesive film is applied to the portion of the face of the strip which faces the glass sheet and which is not in contact with the latter so as to avoid any undesired bonding.

Figure 3:
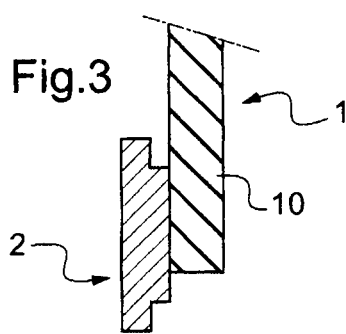

FIG. 3 represents a cross-sectional view of one embodiment variant. In this variant, the strip is not parallelepipedal. It has notches on the perimeter of its face that faces the glass sheet. This T-shaped strip makes it possible to substantially improve the acoustic damping.

Figure 4:
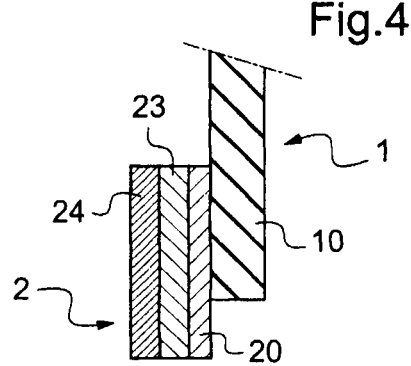

FIG. 4 represents a cross-sectional view of a second embodiment variant. The strip 2 comprises a plurality of damping elements 20, 23, 24.

It has been observed that the greater the thickness e of the strip 2, the more effective the damping. Thus, instead of manufacturing one damping element with a greater thickness, it is easier to manufacture several damping elements of lesser thickness and to superpose them. This makes it possible to increase the total thickness of the strip 2 and thus to improve the damping. It is however noted that the total thickness of the strip 2 is limited by the constraints of space inside the body of the vehicle.

Each material of each damping element 20, 23, 24 has a loss factor greater than 0.2 and a Young's modulus greater than 800 MPa, at 20° C. and at a particular frequency $f_p$ of the glazing unit which corresponds to the critical frequency of the glazing unit to within plus or minus 300.

FIG. 5 represents a cross-sectional view of a third embodiment variant. The strip 2 comprises a damping element 20 and a non-damping rigid interlayer element 3, the non-damping rigid interlayer element 3 being sandwiched between the damping element 20 and the glass sheet.

The non-damping rigid element 3 is constituted of a material which has a loss factor of less than 0.2 and a Young's modulus of greater than 1600 MPa. The non-damping rigid element 3 is, for example, made of glass or of polycarbonate. The non-damping rigid element 3 has, for example, a thickness of 3 mm. The means of fastening between the various elements are adapted in order to be compatible with the constituent materials of said elements.

FIG. 6 represents a cross-sectional view of a fourth embodiment variant. Joined to the glass sheet 10 are two strips 2, with a strip respectively on each face 11 and 12 of the glass sheet 10. This makes it possible to increase the damping relative to one strip on a single face. Furthermore, the thickness of the strip is limited by the dimensions of the space in which it must be housed in the body of a vehicle. Distributing the thickness on each side of the glass sheet may thus allow better damping.

FIG. 7 represents a perspective view of a fifth embodiment variant. The glazing unit comprises, on the same face of the glass sheet, a plurality (at least two) of strips 2, which may or may not be juxtaposed, and may or may not be abutted. This makes it possible to manufacture small strips and to distribute them as desired on the glass sheet, for example, in order to adjust the arrangement of the thickness of the glazing unit comprising the strip as a function of the space in the body of the vehicle intended to receive the glazing unit. In FIG. 7, two strips 2 are fastened to the glass sheet 10. The strip surface area in contact with the glass sheet differs between the two strips.

FIG. 8 represents a perspective view of a sixth embodiment variant. The strip has a geometry adapted to the shape of the glass sheet. In particular, the strip has a shape adapted to that of the bottom edge 14 of the bottom band 13 of the glazing unit, which here is not rectilinear but comprises cutouts.

The strip may thus have, for example, a trapezoid shape.

The various embodiments from FIGS. 1 to 8 may all be combined.

In all of these embodiments, the strip is not joined to any other device on the opposite side of the glass sheet.

Furthermore, the invention also relates to a method of manufacturing a glazing unit according to the invention, for the purpose of reducing acoustic and vibratory nuisance in a passenger compartment of a vehicle, especially an automobile, comprising such a glazing unit, the method comprising the following steps:

providing a glazing unit comprising at least one glass sheet;
providing at least one vibroacoustic damping strip comprising at least one element made of damping material;
fastening the strip to at least one of the faces of the glazing unit so that the face of the vibroacoustic damping strip facing the glass sheet has a surface area in contact with the glass sheet which is strictly inferior to the surface area of said face of the strip facing the glass sheet.

This manufacturing method enables a glazing unit to be obtained which makes it possible to damp noise while taking up little space.

The invention also relates to a method of acoustic protection in a passenger compartment of a vehicle, especially of an automobile, comprising the following step:

the mounting, in the body of the vehicle, of a glazing unit having improved vibroacoustic damping properties which comprises at least one glass sheet and at least one vibroacoustic damping strip, the strip comprising at least one element made of damping material and the strip being fastened to one of the faces of the glazing unit, the face of the strip facing the glass sheet having a surface area in contact with the glass sheet which is strictly inferior to the surface area of said face of the strip facing the glass sheet.

Thus, the vehicle equipped with the glazing unit according to the invention benefits from a noise-damping device that is not very bulky.

As examples that are in no way limiting, the table below cites several damping materials for the strip of the glazing unit according to the invention. The loss factor and the Young's modulus are given at 20° C. and at a frequency of 3100 Hz (critical frequency of a 3.85 mm thick glazing unit), these values being measured using a viscoanalyzer:

| Trade name | Type of material | Young's modulus $E'_v$ (MPa) | Loss factor tan δ |
|---|---|---|---|
| Stickson from Akdev Soprema | Bituminous | 900 | 0.38 |
| Sonit BS100 from Aksys | Bituminous | 2900 | 0.37 |
| IK9709 from Rieter Automotive | Bituminous | 1700 | 0.43 |
| ISODAMP C1100-12 from EARsc | Vinyl-based polymer | 900 | 0.35 |

In order to demonstrate the effectiveness of the damping means of the invention, the attenuation in the vibration level of a glazing unit, equipped with damping means compared to the same, blank glazing unit, was demonstrated over a range of frequencies from 200 to 6300 Hz including the critical frequency of the glazing unit at 3700 Hz.

A glazing unit equipped with damping means of the invention excited via an airborne route, has lower vibration levels than the blank glazing unit since the vibrational energy of the glazing unit is dissipated through the strip 2. Hence, the pressure levels in the passenger compartment are lower, and consequently, the noise is attenuated.

FIG. 9 thus shows comparative curves of the raw acoustic insulation obtained with, on the one hand, a glazing unit provided with damping means of the invention and, on the other hand, an equivalent glazing unit that does not have the means of the invention.

The glazing unit used as a test is a movable glazing unit of a front door of a Mégane II (Renault SA) having a thickness of 3.15 mm and a surface area of 0.39 m². Its critical frequency is thus close to 3700 Hz.

The Cref curve corresponds to the blank glazing unit. The C1 curve corresponds to the glazing unit equipped with the strip 2. The strip is parallelepipedal and has the following dimensions: length L1 of 600 mm, width L2 of 50 mm, and thickness e of 5.4 mm. The material of the strip is an IK9709 tape from Rieter Automotive (cf. table above). This strip is sold commercially with a pre-applied double-sided adhesive tape that is compatible with the glass for the bonding thereof.

The strip is fastened to the glass sheet over 70% of its surface area. The remaining 30% of the surface area is equipped with a non-adhesive film.

This glazing unit is installed in a front right door of a Mégane II type vehicle, the other glazing units of which were masked using a septum. The raw insulation per one-third octave was thus measured for frequencies ranging from 200 to 6300 Hz. These measurements are carried out at an ambient temperature of 18° C.

It is demonstrated, by comparing the curves from FIG. 9, that the raw acoustic insulation of the glazing unit is improved at the critical frequency (difference of 3.2 dB over the one-third octave centered about 4000 Hz).

Consequently, while in accordance with the first objective of the invention, it is possible to dissipate a maximum of vibrational energy in the region of the critical frequency of the glazing unit (over a range that extends from minus 30% to plus 30% of the critical frequency), the invention also makes it possible to ensure good vibroacoustic damping over a wider range of frequencies, including at medium frequencies. Specifically, it can be seen in FIG. 9 that the insulation curve C1 relating to the glazing unit of the invention is above the curve Cref, corresponding to the blank glazing unit, above 500 Hz.

Furthermore, the invention also makes it possible to reduce the total weight of the glazing unit by reducing the thickness of the glass sheet(s) without degrading its acoustic performance. For example, the reduction of the thickness of the glass from 3.85 mm to 3.15 mm makes it possible to reduce the weight of glass by 18%. The addition of a strip having an element made of damping material that has a loss factor greater than 0.2 and a Young's modulus greater than 800 MPa, at 20° C. for a particular frequency $f_p$ corresponding to the critical frequency of the glazing unit to within plus or minus 30%, makes it possible, by adding only 8% by weight, to compensate for the acoustic degradation linked to the reduction in thickness. A saving of 10% of the total weight of the glazing unit may thus be obtained for equivalent acoustic performance.

FIG. 10 shows comparative curves of raw acoustic insulation between a blank glazing unit having a thickness of 3.85 mm and a glazing unit according to the invention with a glass thickness of 3.15 mm, provided with a strip.

The glazing unit used as a test is a movable glazing unit of a front door of a Mégane II (Renault SA) having a surface area of 0.39 m².

The C2ref curve corresponds to the blank glazing unit having a thickness of 3.85 mm. Its critical frequency is thus close to 3150 Hz.

The C1 curve corresponds to the glazing unit according to the invention, with a glass thickness of 3.15 mm and a strip 2. The critical frequency of the glazing unit according to the invention is thus close to 4000 Hz. The C1 curve is identical to the C1 curve from FIG. 9. The strip is parallelepipedal and has the following dimensions: length L1 of 600 mm, width L2 of 50 mm, and thickness e of 5.4 mm. The material of the strip is an IK9709 tape from Rieter Automotive (cf. table above). This strip is sold commercially with a pre-applied double-sided adhesive tape that is compatible with the glass for the bonding thereof.

The strip is fastened to the glass sheet over 70% of its surface area. The remaining 30% of the surface area is equipped with a non-adhesive film.

This glazing unit is installed in a front right door of a Mégane II type vehicle, the other glazing units of which were masked using a septum. The raw insulation per one-third octave was thus measured for frequencies ranging from 200 to 6300 Hz. These measurements are carried out at an ambient temperature of 18° C.

It is demonstrated by comparing the curves from FIG. 10, that the acoustic insulation of the glazing unit is improved at the critical frequency (difference of 4.1 dB over the one-third octave centered about the critical frequencies).

The invention claimed is:

1. A glazing unit having improved vibroacoustic damping properties, comprising:
   at least one glass sheet;
   at least one vibroacoustic damping strip, the strip including at least one element made of damping material, and the strip being fastened to a face of the glass sheet via contact between only a portion of a face of the strip facing the glass sheet and the face of the glass sheet, such that a surface area of the portion of the face of the strip in contact with the glass sheet is less than a total surface area of the face of the strip facing the glass sheet.

2. The glazing unit as claimed in claim 1, wherein the surface area of the portion of the face of the strip in contact with the glass sheet is greater than or equal to 25% of the total surface area of the face of the strip facing the glass sheet.

3. The glazing unit as claimed in claim 2, wherein the surface area of the portion of the face of the strip in contact with the glass sheet is equal to around 70% of the total surface area of the face of the strip facing the glass sheet.

4. The glazing unit as claimed in claim 1, wherein the element made of damping material has a loss factor greater than 0.2 and a Young's modulus greater than 800 MPa, at 20° C. for a particular frequency $f_p$ corresponding to a critical frequency of the glazing unit to within plus or minus 30%.

5. The glazing unit as claimed in claim 1, wherein the strip is not joined to any other device on an opposite side of the glass sheet.

6. The glazing unit as claimed in claim 1, wherein the strip extends over at most a length of the glazing unit.

7. The glazing unit as claimed in claim 1, wherein the strip comprises a plurality of elements made of damping material.

8. The glazing unit as claimed in claim 1, wherein the at least one vibroacoustic damping strip includes a plurality of strips joined to a same face of the glazing unit.

9. The glazing unit as claimed in claim 1, wherein the strip further includes a rigid interlayer element that is arranged between the element made of damping material and the glass sheet, the rigid interlayer element having a loss factor of less than 0.2 and a Young's modulus greater than 1600 MPa at 20° C. for a particular frequency chosen $f_p$.

10. The glazing unit as claimed in claim 1, further comprising bonding means of double-sided adhesive type disposed on the face of the strip facing the glass sheet.

11. A vehicle, comprising:
    a body; and
    a glazing unit as claimed in claim 1,
    wherein the strip of the glazing unit is hidden from an external view of the vehicle by the body.

12. The vehicle as claimed in claim 11, wherein the glazing unit is an openable glazing unit on a side of the vehicle.

13. A method of manufacturing a glazing unit as claimed in claim 1, for reducing acoustic and vibratory nuisance in a passenger compartment of a vehicle including the glazing unit, the method comprising:
    providing a glazing unit including at least one glass sheet;
    providing at least one vibroacoustic damping strip including at least one element made of damping material;
    fastening the strip to a face of the glass sheet of the glazing unit via contact between only a portion of a face of the vibroacoustic damping strip facing the glass sheet and the face of the glass sheet, such that a surface area of the portion of the face of the strip in contact with the glass sheet is less than a total surface area of the face of the strip facing the glass sheet.

14. A method of acoustic protection in a passenger compartment of a vehicle, comprising:
    mounting, in a body of the vehicle, a glazing unit having improved vibroacoustic damping properties which includes at least one glass sheet and at least one vibroacoustic damping strip, the strip including at least one element made of damping material, and the strip being fastened to a face of the glass sheet via contact between only a portion of a face of the strip facing the glass sheet and the face of the glass sheet, such that a surface area of the portion of the face of the strip in contact with the glass sheet is less than a total surface area of said face of the strip facing the glass sheet.

15. The method of acoustic protection in a vehicle passenger compartment as claimed in claim 14, wherein the glazing unit is mounted such that the surface area of the portion of the face of the strip in contact with the glass sheet is greater than or equal to 25% of the total surface area of the face of the strip facing the glass sheet.

16. The glazing unit as claimed in claim 1, comprising a plurality of strips joined to two opposite faces of the glazing unit.

* * * * *